(12) United States Patent
Verykios et al.

(10) Patent No.: US 11,607,657 B2
(45) Date of Patent: Mar. 21, 2023

(54) HEAT INTEGRATED REFORMER WITH CATALYTIC COMBUSTION FOR HYDROGEN PRODUCTION

(71) Applicant: HELBIO S.A., Patra (GR)

(72) Inventors: Xenophon Verykios, Patra (GR); Thomas Halkides, Patra (GR); Andreas Stavrakas, Patra (GR); Aris Basagiannis, Patra (GR)

(73) Assignee: HELBIO S.A., Patra (GR)

( * ) Notice: Subject to any disclaimer, the term of this patent is extended or adjusted under 35 U.S.C. 154(b) by 0 days.

(21) Appl. No.: 17/183,607

(22) Filed: Feb. 24, 2021

(65) Prior Publication Data
US 2021/0178351 A1    Jun. 17, 2021

Related U.S. Application Data

(63) Continuation-in-part of application No. 14/376,540, filed as application No. PCT/GR2012/000004 on Feb. 6, 2012, now Pat. No. 10,961,122.

(51) Int. Cl.
*B01J 8/02*       (2006.01)
*B01J 19/24*      (2006.01)
(Continued)

(52) U.S. Cl.
CPC ........... *B01J 12/007* (2013.01); *B01J 8/0214* (2013.01); *B01J 8/0257* (2013.01); *B01J 8/0285* (2013.01);
(Continued)

(58) Field of Classification Search
CPC ............. C01B 3/384; C01B 2203/0811; C01B 2203/142; C01B 2203/82;
(Continued)

(56) References Cited

U.S. PATENT DOCUMENTS 4,401,554 A    8/1983   Choi et al.
4,714,593 A    12/1987  Naito et al.
(Continued)

FOREIGN PATENT DOCUMENTS

DE    2610556 B1    6/1977
EP    0124226 A2    11/1984
(Continued)

OTHER PUBLICATIONS

Lattner J R et al: Compari son of methanol-based fuel processors for PEM fuel cell systems, Applied Catalysis B: Environmental, Elsevier, Amsterdam, NL, vol. 56, No. 1-2, Mar. 10, 2005, pp. 149-169, XP025331817, ISSN: 0926-3373, DOI.
(Continued)

*Primary Examiner* — Imran Akram
(74) *Attorney, Agent, or Firm* — Carter, DeLuca & Farrell LLP; George Likourezos

(57) ABSTRACT

An apparatus for the production of hydrogen from a fuel source includes a combustor configured to receive a combustor fuel and convert the combustor fuel into a combustor heat; a reformer disposed annularly about the combustor, a removable structured catalyst support disposed within the gap and coated with a catalyst to induce combustor fuel combustion reactions that convert the combustor fuel to the combustor heat, and a combustor fuel injection aperture configured for mixing combustion fuel into the combustion catalyst. The combustor fuel injection aperture being disposed along a length of the combustion zone. The reformer and the combustor define a gap therebetween and the reformer is configured to receive the combustor heat.

15 Claims, 6 Drawing Sheets

(51) Int. Cl.
*C01B 3/38* (2006.01)
*B01J 12/00* (2006.01)
*B01J 23/89* (2006.01)
*B01J 23/86* (2006.01)

(52) U.S. Cl.
CPC .......... *B01J 19/244* (2013.01); *B01J 19/249* (2013.01); *B01J 23/866* (2013.01); *B01J 23/8993* (2013.01); *C01B 3/38* (2013.01); *B01J 2219/1943* (2013.01); *B01J 2219/2454* (2013.01); *B01J 2219/2459* (2013.01); *B01J 2219/2465* (2013.01); *B01J 2219/2467* (2013.01); *B01J 2219/2479* (2013.01); *B01J 2219/2485* (2013.01); *C01B 2203/0811* (2013.01)

(58) Field of Classification Search
CPC ..... C01B 2203/1082; C01B 2203/1011; C01B 2203/0883; C01B 2203/1005; C01B 2203/1017; C01B 2203/1035; C01B 2203/141; C01B 2203/143; B01J 8/067; B01J 2208/00309; B01J 2219/2465; B01J 2219/2459; B01J 2219/2479; B01J 8/0214; B01J 12/007; B01J 2208/00132; B01J 2219/00117; B01J 19/2425; B01J 2208/0084; B01J 2219/1943; B01J 8/0257; B01J 2219/00081

See application file for complete search history.

(56) References Cited

U.S. PATENT DOCUMENTS

| | | | |
|---|---|---|---|
| 4,909,808 A | 3/1990 | Voecks | |
| 5,997,594 A * | 12/1999 | Edlund | B01D 53/228 |
| | | | 95/56 |
| 6,387,554 B1 | 5/2002 | Verykios | |
| 6,616,909 B1 | 9/2003 | Tonkovich et al. | |
| 7,037,485 B1 | 5/2006 | Drnevich et al. | |
| 7,410,565 B1 | 8/2008 | Lapinski et al. | |
| 2002/0071797 A1 | 6/2002 | Loffler et al. | |
| 2002/0146359 A1 | 10/2002 | Lomax et al. | |
| 2003/0105172 A1 | 6/2003 | Bowe et al. | |
| 2004/0105795 A1 | 6/2004 | Gough | |
| 2004/0258587 A1 | 12/2004 | Bowe et al. | |
| 2005/0123472 A1 | 6/2005 | Hall et al. | |
| 2006/0154123 A1 | 7/2006 | Kim et al. | |
| 2006/0191200 A1 * | 8/2006 | Maenishi | B01J 8/0257 |
| | | | 48/127.9 |
| 2007/0071663 A1 | 3/2007 | Lee et al. | |
| 2007/0258872 A1 | 11/2007 | West et al. | |
| 2007/0258883 A1 | 11/2007 | West et al. | |
| 2008/0166276 A1 | 7/2008 | Bowe | |
| 2009/0064579 A1 | 3/2009 | Wakasugi et al. | |
| 2009/0258259 A1 | 10/2009 | Leshchiner et al. | |
| 2010/0043289 A1 | 2/2010 | England et al. | |
| 2010/0178219 A1 | 7/2010 | Verykios et al. | |
| 2010/0324158 A1 | 12/2010 | Bowe et al. | |
| 2013/0195735 A1 * | 8/2013 | Fischer | B01J 8/0496 |
| | | | 422/625 |
| 2017/0010019 A1 * | 1/2017 | Karkow | F23D 14/145 |

FOREIGN PATENT DOCUMENTS

| | | |
|---|---|---|
| EP | 0922666 A1 | 6/1999 |
| EP | 1024111 A1 | 8/2000 |
| EP | 1361919 A1 | 11/2003 |
| EP | 1679111 A2 | 7/2006 |
| EP | 1679758 A1 | 7/2006 |
| EP | 1767265 A2 | 3/2007 |
| EP | 2158962 A1 | 3/2010 |
| JP | S58176103 A | 10/1983 |
| JP | 3072562 B2 | 7/2000 |
| WO | 9902263 A1 | 1/1999 |
| WO | 2008146052 A1 | 12/2008 |

OTHER PUBLICATIONS

Delsman et al: "Comparison Between Conventional Fixed-Bed and Microreactor Technology for a Portable Hydrogen Production Case", Chemical Engineering Research and Design, Part A, Institution of Chemical Engineers, vol. 83, No. 9, Sep. 1, 2005, pp. 1063-1075.
International Search Report issued by the European Patent Office in connection with International Applicaiton No. PCT/GR2012/000004, dated May 22, 2012.
International Search Report issued by the European Patent Office in relation to International Applicaiton No. PCT/GR2012/000011 dated Nov. 29, 2012.
Canadian Office Action dated Apr. 30, 2019 corresponding to counterpart Canadian Patent Application No. 2,862,538.
Canadian Office Action dated Jun. 27, 2019 corresponding to counterpart Patent Application CA 2,862,527.
Written Opinion of the International Searching Authority issued by the European Patent Office in relation to International Application No. PCT/GR2012/000004 dated May 22, 2012.
European Office Action received from the European Patent Office in relation to Application No. 12 709 166.8-1106 dated Apr. 30, 2020.

* cited by examiner

HEAT INTEGRATED REFORMER WITH CATALYTIC COMBUSTION FOR HYDROGEN PRODUCTION

RELATED APPLICATION

The present patent application is a continuation in part of U.S. patent application Ser. No. 14/376,540, filed Aug. 4, 2014, which is a U.S. National Stage Application filed under 35 U.S.C § 371(a) of International Application No. PCT/GR2012/000004, filed Feb. 6, 2012. The entire contents of each of the foregoing applications are hereby incorporated herein by reference.

TECHNICAL FIELD

This disclosure relates to reforming reactor assemblies for hydrogen production and more particular to reactors where hydrocarbons or oxygenates are reformed to produce a hydrogen rich stream.

BACKGROUND

Hydrogen is used in many chemical processes as for example in ammonia synthesis and in oil refining, in very large quantities. There are other processes which require hydrogen in smaller quantities, as for example oil hydrogenation plants, glassblowing operations, cooling applications in electricity production, photovoltaic materials processing, etc. Furthermore, the use of hydrogen as an alternative energy vector has gained wide acceptance and is progressing along the road to implementation. Hydrogen can be used in both internal combustion engines and fuel cells. Particularly, its usage in fuel cells to produce electricity or to co-generate heat and electricity represents the most environmentally friendly energy production process due to the absence of any pollutant emissions. Most importantly, hydrogen can be produced from renewable energy sources such as biofuels, alleviating concerns over the long-term availability of fossil fuels and energy supply security.

Large scale production of hydrogen is well understood and widely practiced in refineries and chemical plants—particularly in the ammonia production industry. For industrial applications requiring smaller quantities, hydrogen is usually transported either cryogenically or in highly compressed form. The reason is that the technology for large scale hydrogen production cannot be easily downscaled. Furthermore, for hydrogen to be successfully introduced into the transportation and distributed energy production sectors, refueling and distribution networks must be established.

The problem lies in the low energy density of hydrogen which makes its transportation very inefficient and expensive. Transporting hydrogen in compressed or liquid form requires specialized and bulky equipment that minimizes the amount that can be safely carried, increasing resource consumption and cost. It is, then, apparent that the hydrogen infrastructure required must be based on distributed production facilities. This applies to both, hydrogen as industrial chemical of medium or low consumption and as an energy vector.

Distributed hydrogen production facilities are the focus of numerous research and development activities. While the scale of such facilities is much smaller than the ones employed in the refineries and the large chemical plants, the basic steps remain the same. The most commonly employed method involves hydrogen production by the reformation of hydrocarbon fuels. These fuels must already have an established distribution network as to address the raw material availability concerns. They include natural gas, propane, butane (LPG) and ethanol as the representative of the biofuels. Natural gas is mostly methane and can be reformed according to the reaction:

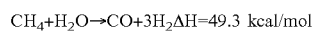
$CH_4 + H_2O \rightarrow CO + 3H_2 \, \Delta H = 49.3$ kcal/mol

Propane, butane and ethanol can be reformed according to the reactions:

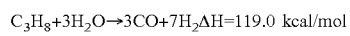
$C_3H_8 + 3H_2O \rightarrow 3CO + 7H_2 \, \Delta H = 119.0$ kcal/mol

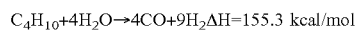
$C_4H_{10} + 4H_2O \rightarrow 4CO + 9H_2 \, \Delta H = 155.3$ kcal/mol

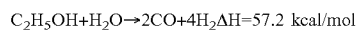
$C_2H_5OH + H_2O \rightarrow 2CO + 4H_2 \, \Delta H = 57.2$ kcal/mol

As can be seen from the heats of reaction ($\Delta H$), all of the reforming reactions are highly endothermic, requiring substantial amounts of heat input which must be covered by an external heat supply. The heat deficit becomes even larger since the reactions take place at temperatures in the range of 700-900° C. which means that the reactants must be heated-up to such temperatures.

The reforming reactions typically take place in steam methane reformers. The reforming reaction takes place inside reforming tubes filled with a reforming catalyst. The reforming tubes are typically at high pressure of 20-30 bar. The required heat is typically supplied by placing the catalyst containing tubes of the reactor in rows inside a fired furnace. Between the rows are placed combustion burners that combust fuel and air in an open flame to provide the required heat. The high temperature of the flame necessitates that the combustion burners must be placed at a sufficient distance from the reforming tubes to prevent the tubes from high temperature exposure which could destroy the tubes. This is a rather inefficient arrangement since the hydrogen producing reforming reaction forms a small part of overall reactor. Materials limitations also dictate the avoidance of extremely high temperatures (>1000° C.) for the reforming reactor tubes, further limiting the ability to place the combustion burners in close proximity to the reforming tubes. All these mean that traditional steam methane reforming reactor configurations are very large and new configurations must be developed to decrease the size and the cost of such systems.

Different configurations have been proposed previously. For reactions requiring high heat fluxes, like the reforming reactions, U.S. Pat. No. 6,616,909 describe a reactor system consisting of porous foam catalysts in conjunction with microchannel reactors to obtain high rates of heat transfer. Such a configuration presents significant difficulties, such as excessive pressure drop, which will limit its effectiveness for large scale systems.

U.S. Pat. No. 6,387,554 describes a reactor consisting of a bundle of small diameter ceramic or metallic tubes enclosed in a thermally insulated vessel. Catalysts are deposited on the internal and external surfaces of the tubes and heat is transferred across the tube walls. Part of the tubes may not be covered by catalyst and may act as heat exchange zones. Although this system resulted in a compact configuration the replacement of the catalyst is problematic and as a result the whole reactor must be replaced when the catalyst effectiveness for either the combustion or the reforming reaction declines.

The reactor described in EP0124226 comprises a double-tube reactor having a steam reforming catalyst coated on the outside of the inner tube. Alternatively, a set of inner tubes may be mounted in a first tube plate and a set of outer tubes in a second tube plate, the tube plates being disposed across a cylindrical shell so as to define a heat exchange zone. The heat source is a burner. Since the heat source is a burner the limitation of burner placement in relation to the reforming catalyst placement prevent the construction of a compact low cost system.

Another reactor described in EP1361919 comprises a tube plate which carries a number of elongated pockets extending transversely into a shell. A second tube plate extends across the shell and supports a number of tubular elongated conduits corresponding to the number of pockets. The conduits are open-ended and extend into and almost to the end of the pockets. Catalyst may be coated on the surfaces of the pockets and/or the conduits. However, in such a configuration catalyst replacement is problematic.

U.S. Patent Application US2010/0178219A1 by Verykios et al. describes a reformer whose tubes are coated with a combustion catalyst on the outer surface and a reforming catalyst on the inner surface. Such a configuration results in high rates of heat transport from the combustion side to the reforming side. However, in such a configuration catalyst replacement is a problem.

SUMMARY

The present disclosure relates to a reformer which produces a hydrogen rich stream by the process known as steam reforming of hydrogen containing compounds, such as hydrocarbons, oxygenates, etc.

In accordance with aspects of the disclosure, an apparatus for the production of hydrogen from a fuel source, includes a combustor configured to receive a combustor fuel and convert the combustor fuel into a combustor heat, a reformer disposed annularly about the combustor, a removable structured catalyst support disposed within the gap and coated with a catalyst to induce combustor fuel combustion reactions that convert the combustor fuel to the combustor heat, and a combustor fuel injection aperture configured for mixing combustion fuel into the combustion catalyst. The reformer and the combustor define a gap therebetween and the reformer is configured to receive the combustor heat. The structured catalyst support being in contact with the combustor and the reformer, forming heat exchange zones where heat is transferred between a feed of the combustor and products of the reformer, and between a feed of the reformer and products of the combustor. The combustor fuel injection aperture being disposed along a length of the combustion zone.

In an aspect of the present disclosure, the combustor fuel injection aperture may include an annular ring including injector holes along a perimeter of the annular ring.

In another aspect of the present disclosure, the reformer may be configured to receive at least a reformer fuel and to produce a reformate containing primarily hydrogen. The reformer may further contain a reforming catalyst to induce reformer fuel reforming reactions to produce the reformate. The structured catalyst support of the combustor may be made of corrugated fecralloy sheets.

In yet another aspect of the present disclosure, the corrugated fecralloy sheets may be coated with a high surface area alumina film containing a dispersed metal phase of palladium or platinum metal, and mixtures thereof.

In a further aspect of the present disclosure, the dispersed metal phase may be between 0.1-10% of the alumina film.

In yet a further aspect of the present disclosure, the reforming catalyst may include a nickel based catalyst.

In another aspect of the present disclosure, the reformer fuel to be reformed and the combustor fuel to be combusted may be in countercurrent flow configuration to each other.

In yet another aspect of the present disclosure, the reforming catalyst may include catalyst pellets.

In a further aspect of the present disclosure, the reforming catalyst may include a structured catalyst support coated with a catalyst.

In yet a further aspect of the present disclosure, the structured catalyst support may be coated with a catalyst is removable.

In another aspect of the present disclosure, the reforming catalyst may be fecralloy sheets coated with a catalyst.

In yet another aspect of the present disclosure, the fecralloy sheets may be in close contact with the combustor and the reformer.

In accordance with aspects of the disclosure, an apparatus for the production of hydrogen from a fuel source, includes a combustor configured to receive a combustor fuel and convert the combustor fuel into a combustor heat, a reformer disposed annularly about the combustor, a removable structured catalyst support disposed within the gap and coated with a catalyst to induce combustor fuel combustion reactions that convert the combustor fuel to the combustor heat, and a combustor fuel injection aperture configured for mixing combustion fuel into the combustion catalyst. The combustor fuel injection aperture is disposed along a length of the combustion zone. The reformer and the combustor define a gape therebetween and the reformer is configured to receive the combustor heat. The structured catalyst support being in contact with the combustor and the reformer.

In yet a further aspect of the present disclosure, the reformer may further contain a reforming catalyst to induce reformer fuel reforming reactions to produce the reformate. The reforming catalyst is a nickel based catalyst.

In another aspect of the present disclosure, the reformer fuel to be reformed and the combustor fuel to be combusted may be in countercurrent flow configuration to each other.

In yet another aspect of the present disclosure, the reforming catalyst may include catalyst pellets.

In a further aspect of the present disclosure, the reforming catalyst may include a structured catalyst support coated with a catalyst.

In yet a further aspect of the present disclosure, the structured catalyst support may be coated with a catalyst is removable.

In yet a further aspect of the present disclosure, the reforming catalyst may include fecralloy sheets coated with a catalyst.

In yet a further aspect of the present disclosure, the fecralloy sheets may be in close contact with the combustor and the reformer.

These and other features and advantages of the present disclosure will become apparent from the following description of the disclosure and the associated drawings.

BRIEF DESCRIPTION OF THE DRAWINGS

A better understanding of the features and advantages of the disclosed systems and methods, and other inventive features, will be obtained by reference to the Detailed Description that sets forth illustrative aspects, in which the principles of the disclosed systems and methods are described, and the accompanying figures of which.

DETAILED DESCRIPTION

Although the present disclosure will be described in terms of specific aspects, it will be readily apparent to those skilled in this art that various modifications, rearrangements, and substitutions may be made without departing from the spirit of the present disclosure.

The technology of the present disclosure is described in detail with reference to a few preferred aspects illustrated in the accompanying drawings. The description presents numerous specific details included to provide a thorough understanding of the present disclosure. It will be apparent, however, to one skilled in the art that the present disclosure can be practiced without some or all of these specific details. On the other hand, well known process steps, procedures and structures are not described in detail as to not unnecessarily obscure the present disclosure.

Figure 1A:
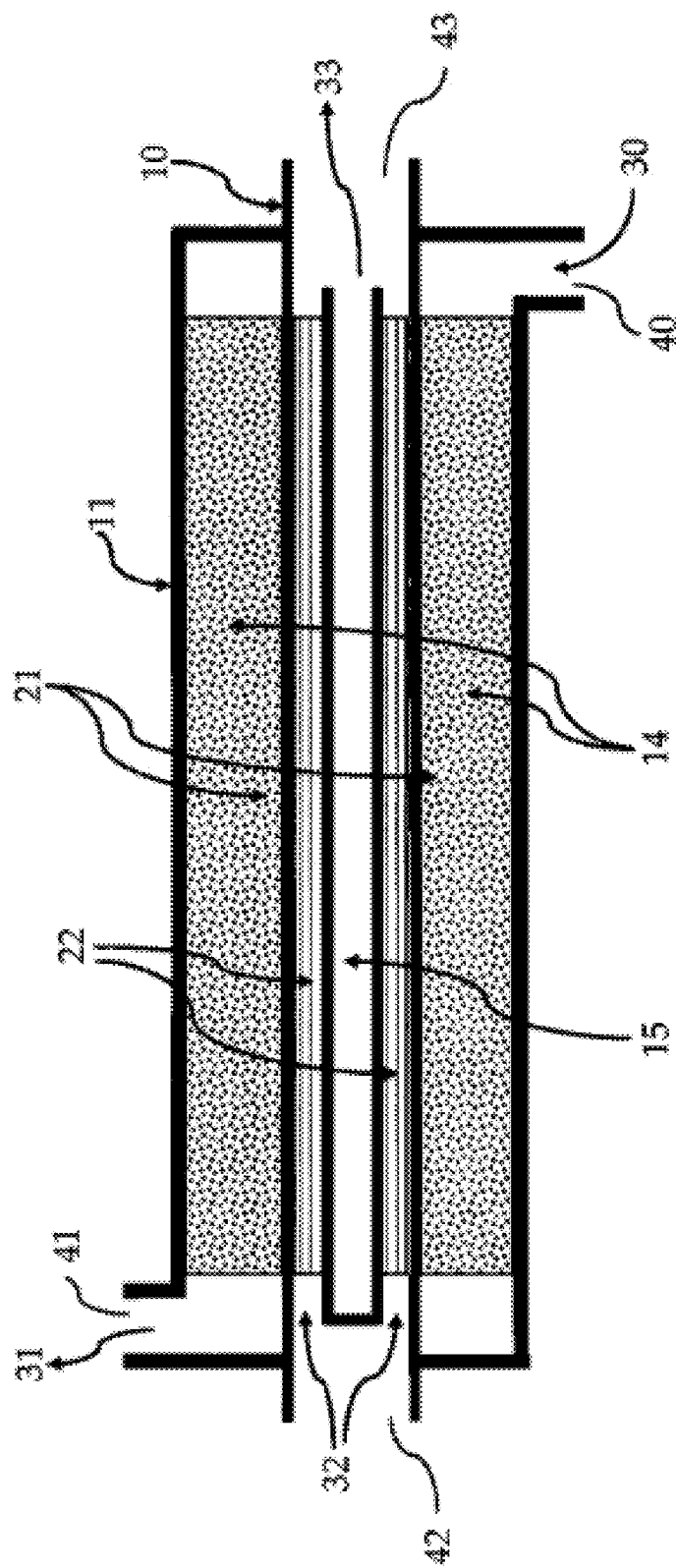
FIG. 1A is a perspective view of one aspect of the heat integrated reformer with catalytic combustion of the present disclosure.

FIG. 1A illustrates the heat integrated reformer according to one aspect of the present disclosure. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the tubular section through flow passage 42 (e.g., a reactor nozzle). The tubular section contains a structured combustion catalyst. An example of a structured catalyst is a fecralloy sheet, preferably corrugated, which is coated with a combustion catalyst 22 that induces the desired reaction in the combustor feed. The products of the combustion reactions 33 exit the tubular section through flow passage 43. A fuel and steam mixture 30 is supplied to the annular passage through flow passage 40. The outside area of the tubular section contains either catalyst pellets 21 capable of inducing the desired reaction in the reformer feed or fecralloy sheets, preferably corrugated, which are coated with the catalyst 21. The products of the reforming reactions 31 exit the annular passage through flow passage 41.

The fuel to the combustor can be any available and suitable fuel. Such fuels include methane, natural gas, propane, butane, liquefied petroleum gas, biogas, methanol, ethanol, higher alcohols, ethers, gasoline, diesel etc. For the aspect illustrated in FIG. 1A, the fuels normally available in liquid form must be vaporized before entering the combustion zone. The same fuels can be fed to the reforming zone to undergo the hydrogen producing reforming reactions. Another potential fuel to the combustor is the hydrogen depleted off-gas from the anode of a fuel cell when the reformer is used as a part of a fuel processor producing hydrogen for a fuel cell. Yet another potential fuel to the combustor is the hydrogen depleted off-gas from the pressure swing adsorption (PSA) or any other hydrogen purification devise when the reformer is used as a part of a fuel processor producing a hydrogen rich stream that feeds such a device to produce high purity hydrogen.

The temperatures and pressures of the two streams entering the combustor and the reformer, respectively, need not be the same. Typically, combustion takes place at low or near-atmospheric pressure, although high pressure combustion is widely practiced. Reforming can take place at pressures somewhat above atmospheric to moderately high (up to 50 barg). The cylindrical wall of the tubular section should be of sufficient strength to allow for the pressure differential between the two streams. It is also apparent that different geometries can be used instead of cylindrical shapes should they offer advantages in particular applications. The composition of the mixture entering the combustor should be such as to ensure complete combustion of the fuel. Although a stoichiometric ratio of air to fuel is sufficient, higher ratios can be employed with the present disclosure. The composition of the mixture entering the reforming section of the assembly is determined by the stoichiometries of the reforming reactions for the given fuel. It is typical practice to provide a higher than stoichiometric steam-to-fuel ratio to minimize possible side reactions that can cause shoot or carbon formation to the detriment of the catalyst and/or the reactor. All suitable steam-to-carbon ratios in the range from 1 to 25 can be employed with the present disclosure.

The major advantage of the present disclosure is the heat integration between the combustion 15 and the reforming 14 zones. Combustion takes place on the catalytic film which is coated on the structured catalyst 22 placed on one side of the wall 10 separating the two zones. The heat that is generated on the combustion side is quickly transferred and used on the reforming side. This rapid heat transfer is critical in maintaining the combustion side catalyst at temperatures below 1200 C and, more preferably, below 1000 C. These temperatures ensure acceptable catalyst life and permit the use of a very compact combustion zone which allows the reactor assembly to be dramatically smaller compared with a flame-based reformer which needs to maintain a significant distance between the flame generation and the reforming sections. The lower temperatures also allow the use of less expensive alloys for the construction of the reactor. The lower temperatures also mean no nitrogen oxide emissions as their formation requires much higher temperatures.

The structured combustion catalyst can preferably be in the form of a corrugated metal foil made of a high temperature resistant metal or metal alloy. A metal alloy such as an alloy with the formula FrCrAlY, commonly referred to as fercalloy, can be used for high temperature combustion catalyst support. The corrugated foil is supported on a rod or tube placed inside tube 10. The corrugated foil is wrapped on the tube or rod so that the corrugated channels run parallel to the axis of the tube 10. Reforming takes place on the catalyst placed in reforming zone 14 enclosed between tube 10 and reactor wall 11. The catalyst 21 can be in the form of pellets or it can be a structured catalyst or monolith. The wall 10 can be constructed from any material, but materials that offer low resistance to heat transfer such as metals and metallic alloys are preferred. In this configuration, heat is generated by combustion in the combustion zone 15 and is transported very easily and efficiently though the wall 10 to the reforming zone 14 where the heat demanding reforming reactions take place. Heat is generated where it is needed and does not have to overcome significant heat transfer resistances to reach the demand location resulting in high efficiencies. The presence of a catalyst and lower temperatures permit significantly higher space velocities to be used compared to flame based reformers. Space velocity is defined as the ratio of the feed flow at standard conditions to the empty volume of the reactor. For the catalyst section of the heat integrated reformer, space velocities of 1000 to 100000 $hr^{-1}$, more preferably 5000-50000 $hr^{-1}$ and even more preferably 10000 to 30000 $hr^{-1}$ can be used. In flame based reformers space velocities are typically below 2000 $hr^1$.

The catalyst on the reforming side can be a pellet catalyst or it can also be a structured catalyst on support. In the case of a pellet catalyst, space velocities similar to the ones used in flame based reformers can be used (1000-10000 $hr^{-1}$). In the case of structured catalyst much higher space velocities can be used preferably 10,000-100000 $hr^{-1}$ or more preferably 10,000-50000 $hr^{-1}$.

The suitable combustion and, where applicable, the reforming catalysts, can be prepared by coating a relatively thin (5-1000 μm thick) catalytic film on the fecralloy sheets. Suitable catalysts typically consist of a metal oxide film and one or multiple metal phases dispersed on the film. The film is typically a metal oxide that may contain oxides of one or multiple elements from the IA, IIA, IIIA, IIIB and IVB groups of the periodic table of elements. The most typical combustion catalysts support is high surface area aluminum oxide. The dispersed metal phase catalyst may contain one or multiple elements from the IB, IIB, VIB, VIIB and VIII groups of the periodic table of elements. A common dispersed metal phase catalyst is palladium or platinum and mixtures thereof. The dispersed metal phase is typically 0.1-10% of the metal oxide film and more preferably 0.3-3%.

One method to prepare the catalytic film that ensures good adhesion to the fercalloy is to heat the fecralloy sheet to elevated temperatures in air. During the heating, aluminum, which is a component of the fercalloy, is diffusing out of the bulk of the alloy and forms an aluminum oxide surface layer. Upon this surface layer it is easy to coat alumina or other metal oxide supports for the desired dispersed metal phase which may be a precious or non-precious metal. Typical supports for reforming and combustion catalysts consist of oxides of aluminum, silicon, lanthanum, cerium, zirconium, calcium, potassium and sodium. The metal phase of reforming catalysts may contain nickel, cobalt, copper, platinum, rhodium and ruthenium. Nickel based catalysts are the most commonly used for reforming reactions.

Coating of the catalysts support on the fercalloy sheets can be accomplished by many techniques. After heating up so as to form the aluminum oxide layer at the surface, techniques such as dip coating from a solution of dispersed metal oxide particles or from a slurry which contains the metal oxide particles can be employed. Alternatively, catalyst can be deposited on the fecralloy sheets by spraying the catalytic components onto their surface, or by plasma deposition, etc. The catalyst support is then dried by calcination at elevated temperatures. The dispersed metal phase can be added to the support forming solution or slurry of the metal oxide particles or it can be added in a separate step from a solution of the desirable metal salt after the calcination step.

Figure 1B:
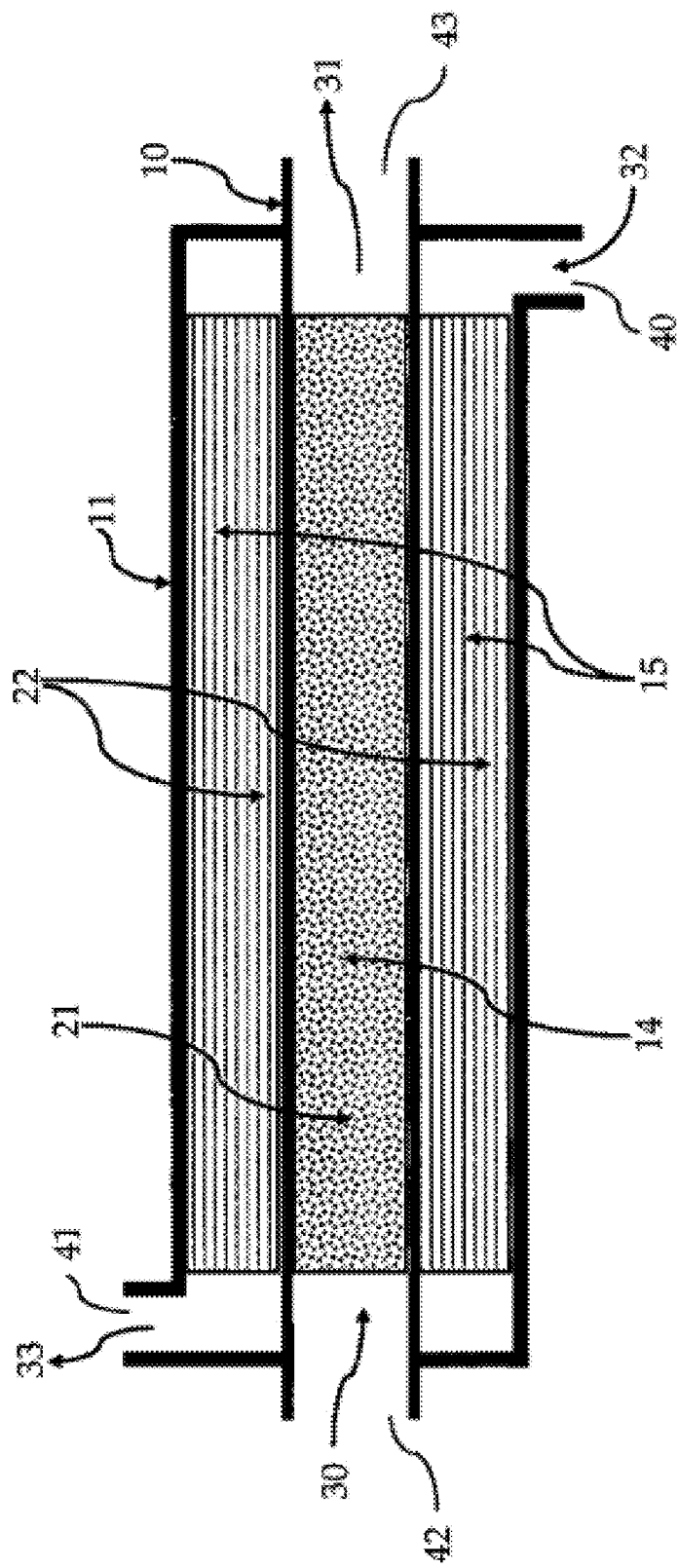
FIG. 1B is a perspective view of another aspect of the heat integrated reformer with catalytic combustion of the present disclosure.

FIG. 1B illustrates the heat integrated reformer according to another aspect of the present disclosure. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the annular passage through flow passage 40. The outside wall of the tubular section contains fecralloy sheets coated with a catalyst film 22 that induces the desired reaction in the combustor feed. The products of the combustion reactions 33 exit the annular passage through flow passage 41. A fuel and steam mixture 30 is supplied to the tubular section through flow passage 42. The tubular section contains reforming catalyst pellets 21 or fecralloy sheets coated with a reforming catalyst film 21 that induces the desired reaction in the reformer feed. The products of the reforming reactions 31 exit the tubular section through flow passage 43.

Figure 1C:
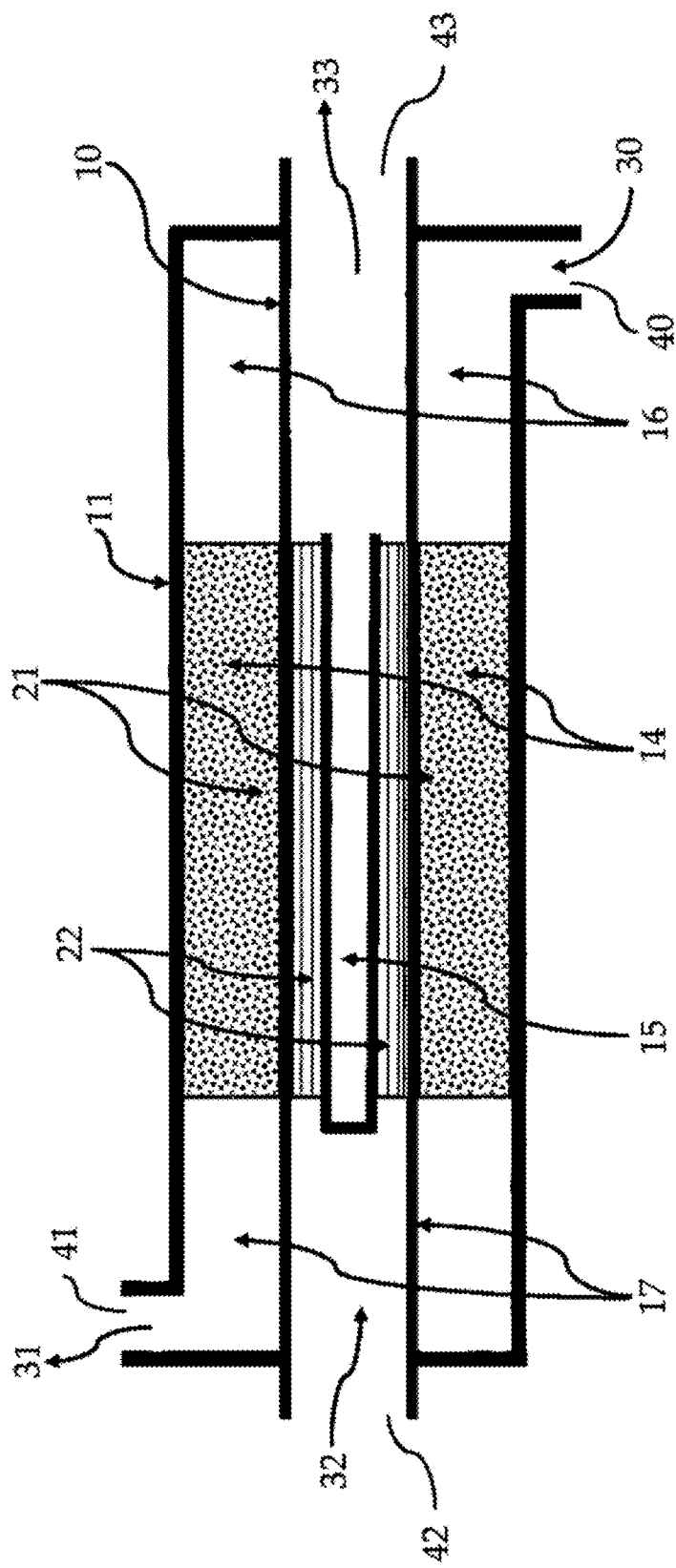
FIG. 1C is a perspective view of another aspect of the heat integrated reformer with catalytic combustion of the present disclosure.

FIG. 1C illustrates the heat integrated reformer according to yet another aspect of the present disclosure. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the tubular section through flow passage 42. In this aspect, the middle part of the inside wall of the tubular section contains the catalyst film 22 that induces the desired reaction in the combustor feed. Similarly, the middle part of the outside of the tubular section contains catalyst 21 or fecralloy sheets coated with catalyst 21 that induces the desired reaction in the reformer feed. The parts of the reactor assembly which do not contain catalyst function as heat exchange regions of the reformer. Heat exchange zone 16 transfers heat from the hot combustion products to preheat the reforming section feed. Heat exchange zone 17 transfers heat from the hot reforming products to preheat the combustion section feed. In this manner, greater heat integration and utilization is accomplished inside the reformer. The products of the combustion reactions 33 exit the tubular section through flow passage 43. A fuel and steam mixture 30 is supplied to the annular passage through flow passage 40 counter-current to the combustion gases. The products of the reforming reactions 31 exit the annular passage through flow passage 41.

Figure 2A:
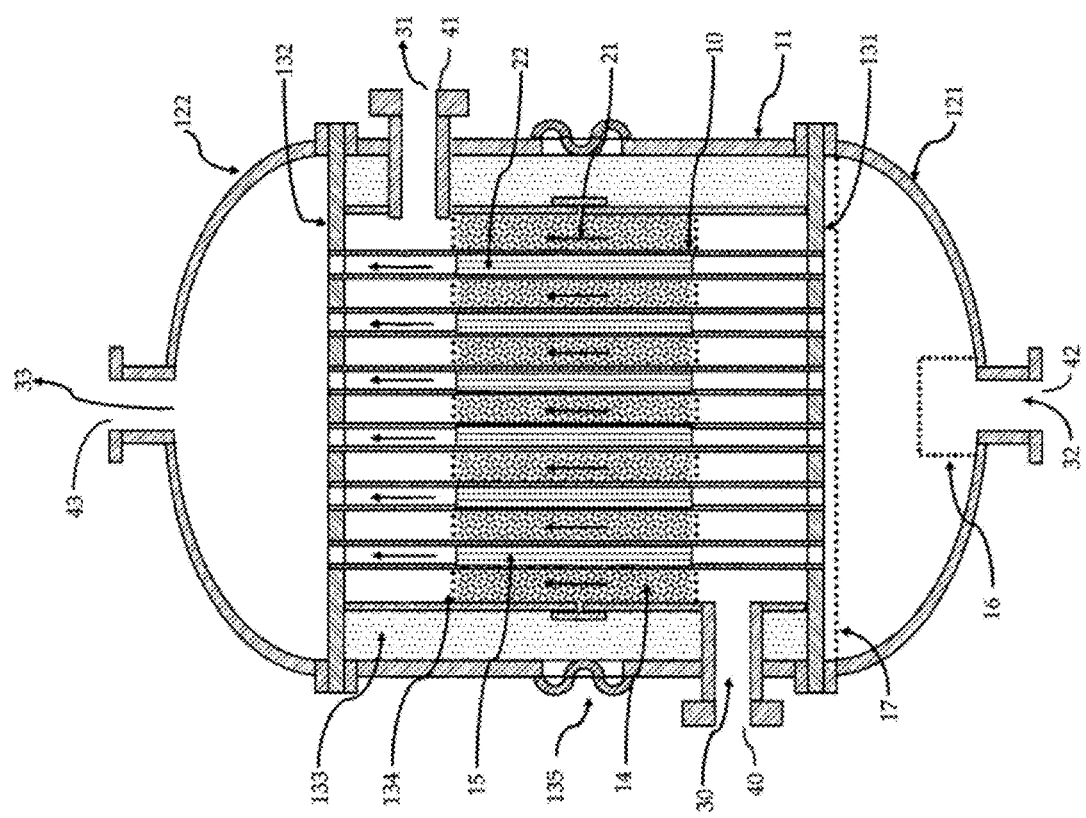
FIG. 2A is a perspective view of one aspect of the heat integrated reforming reactor with catalytic combustion of the present disclosure.

The production capacities of the reformers discussed in the previous examples are limited by their size, i.e., the diameter and length of the sections. Capacities of any size can be achieved by bundling together several such subassemblies. FIG. 2A illustrates one aspect of such a heat integrated reforming reactor. The reactor consists of multiple tubes. The inside section of the tube contains the fecralloy sheets coated with a combustion catalyst film 22 that induces the desired combustion reactions. The outside section of the tube contains the reforming catalyst pellets 21 or the fecralloy sheets coated with a reforming catalyst film 21 that induces the desired reforming reactions. The tubes are supported on tube sheets 131 and 132 on each end. The tube sheets are machined as to allow flow contact between the combustor feed, the combustion zone and the combustion product collection spaces. The tubes are welded on the tube sheets as to prevent any mixing between the species participating in the reforming reactions and those participating in the combustion reactions. The tube bundles are enclosed by the reactor wall 11 which also attaches to tube sheets 131 and 132 and defines an enclosed space between the tubes 10 and the tube sheets 131 and 132. This space is the reforming zone 14. The reactor further consists of reactor heads 121 and 122. Ceramic insulation 133 in the form of a hard cast ceramic or fiber blanket can be added to minimize heat loss of the reactor and maintain the reactor wall temperature below 500 C or more preferably below 200 C.

The fuel and air feed to the combustor 32 enters the reactor through flow passage 42 (e.g., a reactor nozzle). The mixture is distributed in the reactor head 121 by flow distributor 16 as to allow for uniform feeding of all tubes 10. Combustion takes place inside the tubes 10 on the combustion catalytic film 22. The combustion products 33 exit at the other end of the tubes supported on tube sheet 132, are collected in the reactor head 122 and leave the reformer through reactor nozzle 43. Since the tubes 10 and tube sheet 131 become very hot during operation, a flame arresting devise 17, which can be a perforated metallic sheet or a porous ceramic plate, is placed before tube sheet 131 to prevent back flash and uncontrolled combustion in the reactor head 121. The fuel and steam reforming feed 30 enters the reactor through flow passage 40. The mixture comes in flow contact with the reforming catalyst pellets or reforming catalyst film 21 supported on the fecralloy sheets in contact with the outside wall of the tubes 10. The reforming catalyst induces the reforming reactions and the reforming reactions 31 exit the reactor through flow passage 41. The reforming catalyst pellets can be supported in the reactor by a suitable metal plate 134 that is drilled to create holes that are sufficient large that present little resistance to reforming gas flow and keep the pellet catalyst in the desired location in the reactor. This metal plate also serves to distribute the reforming gas feed evenly along the radial dimension of the reactor.

The reactor wall contains an expansion joint 135 to facilitate different thermal expansions between the reactor tubes and the reactor wall, due to the fact that they are at different temperatures.

Figure 1D:
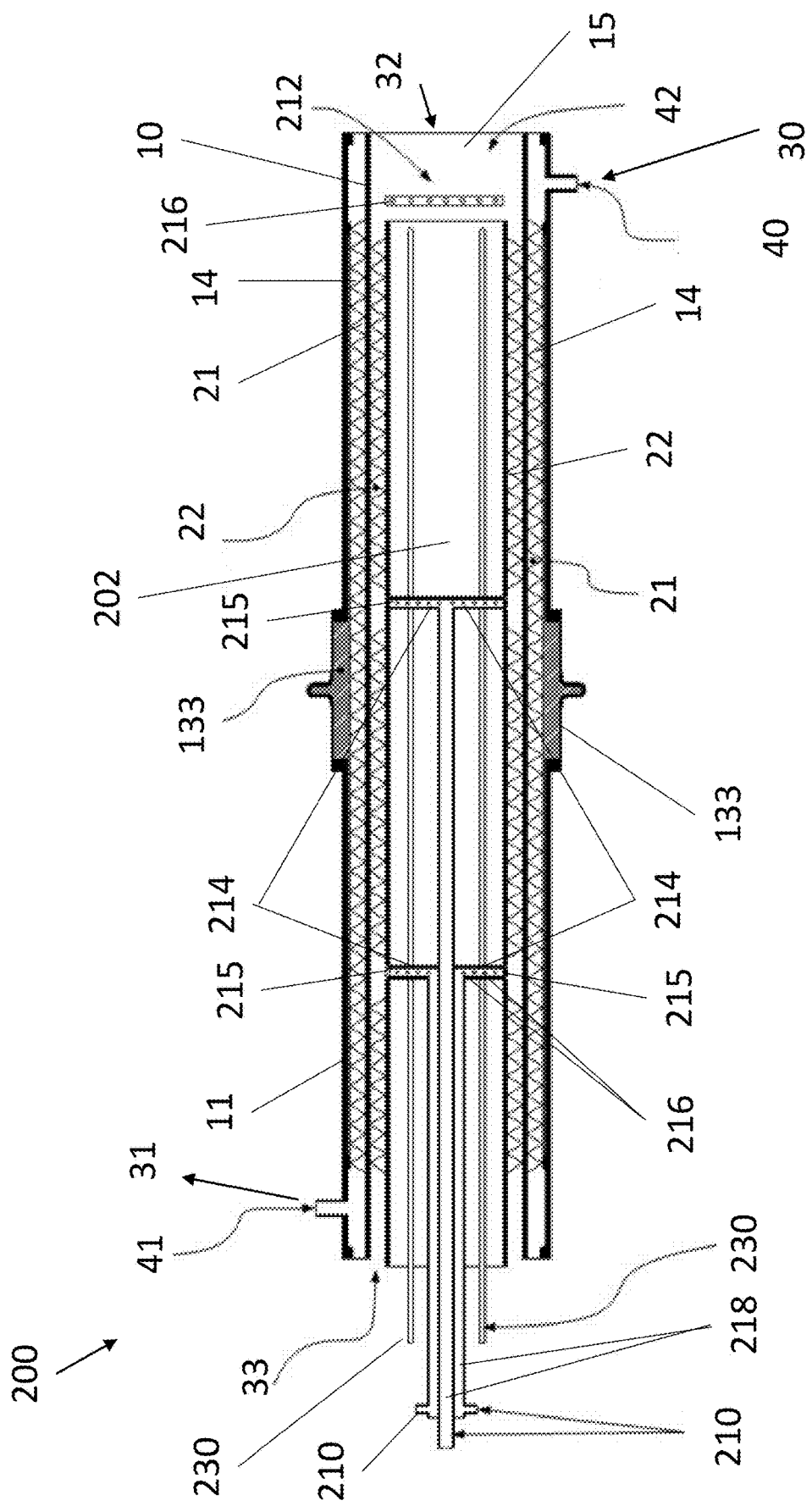
FIG. 1D is a side view of an aspect of the heat integrated reformer with catalytic combustion of the present disclosure.

FIG. 1D illustrates the integrated combustor/steam reformer assembly 200 according to one aspect of the present disclosure. The integrated combustor/steam reformer assembly 200 generally includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the tubular section through flow passage 42. The tubular section contains a structured combustion catalyst. An example of a structured catalyst is a metal film (e.g., a fecralloy sheet), which may be corrugated, is coated with a combustion catalyst 22 that induces the desired reaction in the combustor feed. The products of the combustion reactions 33 exit the tubular section through flow passage 43. In aspects, the housing 11 may contain an expansion joint 135 to facilitate different thermal expansions between the reactor tubes (e.g., wall 10) and the housing 11, due to the fact that they are at different temperatures.

The integrated combustor/steam reformer assembly 200 may further include one or more thermocouples 230. The one or more thermocouples 230 may be disposed in a tubular pipe 202 in direct contact with a wall of the combustion zone 15 and may be configured for controlling the temperature of the integrated combustor/steam reformer assembly 200. For example, the thermocouple 230 may sense a temperature, which may then be used to control the fuel/air mixture 32. A fuel and steam mixture 30 is supplied to the annular passage through flow passage 40. The outside area of the tubular section may include a reforming catalyst 21. The reforming catalyst 21 may include catalyst pellets capable of inducing the desired reaction in the reformer feed. The reforming catalyst 21 may coat the fecralloy sheets (which may be corrugated). The products of the reforming reactions 31 exit the annular passage through flow passage 41.

The fuel to the integrated combustor/steam reformer assembly 200 can be any available and suitable fuel. Such fuels include methane, natural gas, propane, butane, liquefied petroleum gas, biogas, methanol, ethanol, higher alcohols, ethers, gasoline, diesel, etc. The fuels normally available in liquid form must be vaporized before entering the combustion zone 15. The same fuels can be fed to the reforming zone 14 to undergo the hydrogen-producing reforming reactions. Another fuel to the integrated combustor/steam reformer assembly 200 is the hydrogen depleted gas from the anode of a fuel cell when the reformer is used as a part of a fuel processor producing hydrogen for a fuel cell. Yet another potential fuel to the integrated combustor/steam reformer assembly 200 is the hydrogen depleted tail-gas from the pressure swing adsorption (PSA) or any other hydrogen purification device when the reformer is used as a part of a fuel processor producing a hydrogen-rich stream that feeds such a device to produce high purity hydrogen.

Tail gas fuel, mixed with the combustion fuel at any desired proportion between 0 and 100%, is injected onto the combustion catalyst 22 at distinct points along the length of the combustion catalyst 22 through a combustion fuel injector aperture 210 (e.g., along the length of the combustion zone), as illustrated in FIG. 1D, in which two (2) apertures 210 and two (2) such injection points 215 are illustrated, along with the fuel/tail fuel and air injection point 212 at the entrance of the combustor. The mixture of tail gas fuel and combustion fuel reach the injecting points utilizing tubes 218 and are injected into the integrated combustor/steam reformer assembly 200 via annular injector discs 214, which contain a number of injector passages 216 along the perimeter of the annular injector disc 214.

The temperatures and pressures of the two streams entering the combustion zone 15 and the reforming zone 14, respectively, need not be the same. Typically, combustion takes place at low or near-atmospheric pressure, although high-pressure combustion is widely practiced. Reforming takes place at slightly above atmospheric to moderately high (up to 50 bar(g)) pressures. The cylindrical wall 10 of the tubular section should be of sufficient strength to allow for the pressure differential between the two streams. The composition of the mixture entering the combustion zone 15 should be such as to ensure complete combustion of the fuel. Although a stoichiometric ratio of air to fuel is sufficient, higher ratios can be employed with the present disclosure. The composition of the mixture entering the reforming zone 14 of the integrated combustor/steam reformer assembly 200 is determined by the stoichiometries of the reforming reactions for the given fuel. It is typical practice to provide a higher than stoichiometric steam-to-fuel ratio to minimize possible side reactions that can cause shoot or carbon formation to the detriment of the catalyst and/or the reactor. All suitable steam-to-carbon ratios in the range from about 1 to about 25 may be employed with the integrated combustor/steam reformer assembly 200.

The major advantage of the technology of the present disclosure is the heat integration between the combustion zone 15 and the reforming zone 14. Combustion takes place on the combustion catalyst 22 (e.g., catalytic film) on one side of the cylindrical wall 10 separating the combustion zone 15 and the reforming zone 14. Reforming takes place on the catalytic film on the other side of the cylindrical wall 10 separating the two zones. The cylindrical wall 10 can be constructed from any suitable material, but materials that offer low resistance to heat transfer such as metals and metallic alloys are preferred. In this configuration, heat is generated by combustion on the catalytic film and is transported very easily and efficiently through the cylindrical wall 10 the combustion catalyst 22 (e.g., catalytic film) where the heat demanding reforming reactions take place. Heat is generated where it is needed and does not have to overcome significant heat transfer resistances to reach the demand location resulting in high efficiencies.

Specifically, the introduction of fuel/tail gas on multiple points along the length of the integrated combustor/steam reformer assembly 200 permits precise control of the temperature in the combustion zone in such a way as to maximize the rate of heat transport into the reforming zone 14, while, at the same time, minimizing hot spots which can occur in the combustion zone 15. These benefits can be achieved by controlling the rates of injection of fuel/tail gas into the combustion zone 15 between the entrance point (flow passage 42) and the other injection points 215 along the length of the integrated combustor/steam reformer assembly 200.

Suitable combustion catalysts 22 and reforming catalysts 21 must be coated onto the corrugated metals as relatively thin (5-1000 μm thick) films. Suitable catalysts typically consist of a support and one or multiple metal phases dispersed on the support. The support is typically a ceramic that may contain oxides of one or multiple elements from the IA, IIA, IIIA, 111B, and IVB groups of the periodic table of elements. The metal phase may contain one or multiple elements from the 1B, 11B, V11B, V11B, and VIII groups of the periodic table of elements. The most typical combustion catalysts consist or an aluminum oxide support and a precious or semiprecious metal phase. Typical supports for reforming catalysts consist of oxides of aluminum, silicon, lanthanum, cerium, zirconium, calcium, potassium, and/or sodium. The metal phase of reforming catalysts may contain nickel, cobalt, copper, platinum, rhodium, and/or ruthenium.

The reformer reactor shown in FIG. 2A operates in the so-called co-current mode, i.e., combustion and reforming mixtures flow in the same direction. The same reactor configuration can be employed in operation in the so-called counter-current mode, i.e., combustion and reforming mixtures flowing in opposite directions. This can be achieved easily by interchanging the reforming feed and reforming exit nozzles.

Figure 2B:
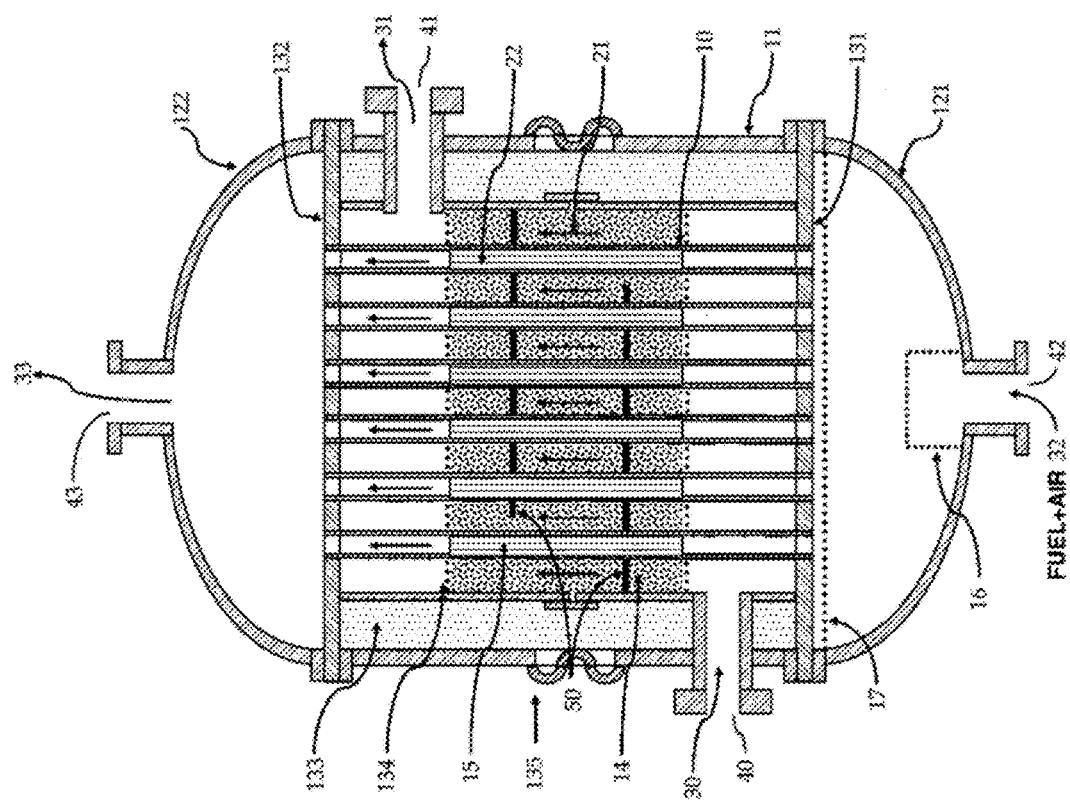
FIG. 2B is a perspective view of another aspect of the heat integrated reforming reactor with catalytic combustion of the present disclosure.

FIG. 2B illustrates another aspect of a heat integrated reforming reactor with catalytic combustion. The fuel and steam reforming feed 30 again enters the reactor through flow passage 40. One or multiple baffles 50 are placed inside the reactor and perpendicular to the tubes 10 as to force the reacting mixture in a cross-flow multi-passage path through the reactor. This ensures higher fluid velocities, greater turbulence and better contact with the catalyst pellets which are outside tubes 10. This in turn results in lower mass transfer resistances in the fluid phase and higher reaction efficiencies while increasing the heat transfer rates as well. The products of the reforming reactions 31 again exit the reactor through flow passage 41.

Yet another aspect of a heat integrated reforming reactor with catalytic combustion can be envisioned. Since the tubes 10 and tube sheet 131 become very hot during operation, combustion can be initiated on the front surface of tube sheet 131 and back propagate through reactor head 121 and, possibly, through flow passage 42 if the fuel and air are pre-mixed. To avoid such a potentially very dangerous situation, the air and fuel can be kept separated until they enter the tubes 10 where combustion is desired. Air entering the reactor head 121 is distributed and uniformly enters the tubes 10 through tube sheets. Fuel enters through the manifold and is distributed to each tube through appropriately sized and shaped tips. Allowing for a slightly higher pressure for the fuel stream than the air stream also allows for the Venturi effect to develop and prevent any fuel from flowing back. Alternatively, increasing the flow of the air stream, pushes the mixture further along the tubes 10 delaying combustion until the mixture is well inside the tubes.

Yet another aspect can be envisioned having the reforming mixture flowing inside the tubes and the combustion mixture flowing in the annulus.] Thus, in FIGS. 2A and 2B, the reforming catalyst, in pellet form or coated on fecralloy sheets, is placed inside tubes 10, while the combustion catalyst is placed in the space outside the tubes. The fuel and steam mixture are directed inside the tubes while the fuel and air mixture are directed in the space outside the tubes 10.

The heat integrated reforming reactor offers several advantages over conventional flame based reforming reactors. The catalytic combustion takes place at lower temperatures that permit close coupling of the combustion and reforming zones. In a flame based reformer the flame must be at a significant distance from the tube containing the reforming catalyst to prevent the tube from melting. As a result, the integrated reforming reactor is several times smaller than a flame based reforming reactor and consequently has a much lower capital and installation cost. The flame based reformers can consist of hundreds of tubes and burners and a sophisticated feed flow distribution system is required to distribute the combustion feed and reforming feed to all burners and tubes evenly. The heat integrated reformer has a single inlet for the reforming and single inlet for the combustion feed gases which results in simple and inexpensive feed flow system. The flame reformers even with the use of low NOx burners still produce significant emissions of NOx in the combustion gases that have to be controlled with a separate selective catalytic reduction (SCR) catalyst and ammonia injection. The heat integrated reformer operates at low temperatures on the combustion side at which NOx formation is negligible.

The heat integrated reformer can be easily integrated with a hydrogen producing process that typically consists of a feed pretreatment system to remove impurities from natural gas, heat recovery equipment to recover heat to preheat the feed and raise steam, one or more water gas shift reactors to convert carbon monoxide to hydrogen and pressure swing adsorption system to separate hydrogen from syngas. The waste stream from the pressure swing adsorption system can be used as fuel to the heat integrated reformer combustion side. Another advantage of the hydrogen production process based on a heat integrated reformer is that the make-up natural gas fuel that is normally supplied to ensure stable burner operation in flame based reformers can be reduced or eliminated. In that case most of the fuel requirement can be supplied by the PSA waste stream.

The hydrocarbon feed to the reformer is typically natural gas but other fuels can be used such as liquefied petroleum gas (LPG), propane, naphtha, diesel, ethanol or biofuels.

In addition to hydrogen, the heat integrated reformer can be used in the production of ammonia, production of methanol, Gas to Liquids, production of ethanol, production of oxo-alcohols and in general in processes where syngas (hydrogen and CO mixture) is required. For some processes it may be advantageous to co-feed carbon dioxide in the reforming zone to promote the conversion to carbon monoxide. In yet another application the heat integrated reformer can be used to produce hydrogen for fuel cells for the production of electricity.

While the technology of the present disclosure has been described in terms of several aspects, there are alterations, permutations and equivalents that fall within the scope of the present disclosure and have been omitted for brevity. It is therefore intended that the scope of the present disclosure should be determined with reference to appended claims.

What is claimed is:

1. An apparatus for the production of hydrogen from a fuel source, comprising:
    a combustor configured to receive a combustor fuel and convert the combustor fuel into combustor heat wherein the combustor includes a combustion zone;
    a reformer disposed annularly about the combustor, wherein the reformer is configured to receive the combustor heat, wherein the reformer includes a reforming zone;
    a cylindrical inner wall separating the combustion zone and the reforming zone, the cylindrical inner wall being:
        in contact with the combustor and the reformer,
        forming heat exchange zones where heat is transferred
            between a feed of the combustor and products of the reformer, and
            between a feed of the reformer and products of the combustor;
    a removable structured catalyst support disposed within the combustion zone and having a surface coated with a combustion catalyst configured to induce combustor fuel combustion reactions within the combustor that convert the combustor fuel to the combustor heat; and
    a tube being disposed along a length of the combustion zone, the tube configured to communicate tail gas fuel to the combustion zone for mixing with combustion fuel, the tube including:
        a plurality of combustor fuel injection apertures configured for mixing tail gas fuel with combustion fuel into the combustion zone, the plurality of combustor fuel injection apertures disposed at a first end portion of the tube, and
        a second end portion that includes annular injector disks including injector passages along a perimeter of the annular injector disks.

2. The apparatus of claim 1, wherein the reformer is configured to receive at least a reformer fuel and to produce a reformate containing primarily hydrogen,
    wherein the reformer further contains a reforming catalyst to induce reformer fuel reforming reactions to produce the reformate
    wherein the structured catalyst support of the combustor is made of corrugated fecralloy sheets.

3. The apparatus of claim 2, wherein the corrugated fecralloy sheets are coated with a high surface area alumina film containing a dispersed metal phase of palladium or platinum metal, and mixtures thereof.

4. An apparatus according to claim 3 wherein the dispersed metal phase is between 0.1-10% of the alumina film.

5. An apparatus according to claim 2, wherein the reforming catalyst includes a nickel based catalyst.

6. The apparatus of claim 2, wherein the reformer fuel to be reformed and the combustor fuel to be combusted are in a countercurrent flow configuration to each other.

7. An apparatus according to claim 2, wherein the reforming catalyst includes catalyst pellets.

8. An apparatus according to claim 2, wherein the reforming catalyst is fecralloy sheets coated with a catalyst.

9. An apparatus according to claim 8, wherein the fecralloy sheets are in contact with the combustor and the reformer.

10. An apparatus for the production of hydrogen from a fuel source, comprising:
    a combustor configured to receive a combustor fuel and convert the combustor fuel into combustor heat wherein the combustor includes a combustion zone;
    a reformer disposed annularly about the combustor, wherein the reformer is configured to receive the combustor heat, wherein the reformer includes a reforming zone;
    a cylindrical wall separating the combustion zone and the reforming zone, the cylindrical wall being in contact with the combustor and the reformer;
    a removable structured catalyst support disposed within the combustion zone having a surface coated with a combustion catalyst configured to induce combustor fuel combustion reactions that convert the combustor fuel to the combustor heat; and
    a tube being disposed along a length of the combustion zone, the tube configured to communicate tail gas fuel to the combustion zone for mixing with combustion fuel, the tube including:
        a plurality of combustor fuel injection apertures configured for mixing tail gas fuel with combustion fuel into the combustion zone, the plurality of combustor fuel injection apertures disposed on an end portion of the tube, wherein a second end portion of the tube includes annular injector disks including injector passages along a perimeter of the annular injector disks;
        a tubular pipe in direct contact with a wall of the combustion zone; and
        a thermocouple disposed within the tubular pipe, the thermocouple configured for controlling a temperature of the apparatus.

11. An apparatus according to claim 10, wherein the reformer further contains a reforming catalyst to induce reformer fuel reforming reactions to produce a reformate, and wherein the reforming catalyst is a nickel-based catalyst.

12. The apparatus of claim 11, wherein the reformer fuel to be reformed and the combustor fuel to be combusted are in a countercurrent flow configuration to each other.

13. An apparatus according to claim 11, wherein the reforming catalyst includes catalyst pellets.

14. An apparatus according to claim 11, wherein the reforming catalyst includes fecralloy sheets coated with a catalyst.

15. An apparatus according to claim 14, wherein the fecralloy sheets are in contact with the combustor and the reformer.

* * * * *